United States Patent [19]

Munjal

[11] Patent Number: 5,936,605
[45] Date of Patent: Aug. 10, 1999

[54] LOSSY COMPRESSION AND EXPANSION ALGORITHM FOR IMAGE REPRESENTATIVE DATA

[75] Inventor: Manoj Munjal, North Andover, Mass.

[73] Assignee: Kodak Limited, Harrow, United Kingdom

[21] Appl. No.: 08/959,734

[22] Filed: Oct. 28, 1997

Related U.S. Application Data

[63] Continuation of application No. 08/265,994, Jun. 27, 1994, abandoned.

[51] Int. Cl.$^6$ .................................................. G06K 15/00
[52] U.S. Cl. ........................................... 345/102; 395/114
[58] Field of Search .................. 395/102, 114, 395/113, 115, 116, 101, 103, 104, 105, 106, 107, 108, 109, 110, 111, 112, 117, 128, 129, 132, 124

[56] References Cited

U.S. PATENT DOCUMENTS

| | | | |
|---|---|---|---|
| 4,058,674 | 11/1977 | Komura | 358/433 |
| 4,281,312 | 7/1981 | Knudson | 379/93.09 |
| 4,851,906 | 7/1989 | Koga et al. | 358/133 |
| 4,963,030 | 10/1990 | Makur | 358/133 |
| 5,060,280 | 10/1991 | Mita et al. | 382/283 |
| 5,172,228 | 12/1992 | Israelsen | 358/133 |
| 5,179,378 | 1/1993 | Ranganathan et al. | 341/51 |
| 5,247,357 | 9/1993 | Israelsen | 358/133 |
| 5,250,949 | 10/1993 | Frost et al. | 341/200 |
| 5,253,053 | 10/1993 | Chu et al. | 358/133 |
| 5,339,164 | 8/1994 | Lim | 358/261 |
| 5,347,266 | 9/1994 | Bauman et al. | 395/115 |
| 5,361,097 | 11/1994 | Kolceynski | 348/390 |
| 5,371,547 | 12/1994 | Siracusa et al. | 348/426 |
| 5,410,355 | 4/1995 | Kolczynski | 348/438 |
| 5,444,488 | 8/1995 | Goubault et al. | 348/414 |
| 5,444,800 | 8/1995 | Kim | 382/239 |

*Primary Examiner*—Steven P. Sax
*Attorney, Agent, or Firm*—David N. Caracappa

[57] ABSTRACT

A method for compressing and expanding source image representative data is disclosed. The method for compressing rasterized source image representative data comprises the following steps. The rasterized source image representative data is partitioned into a first plurality of sections each containing only blank lines, and a second plurality of sections each containing non-blank image representative data. Each section in the first plurality of sections is represented by a respective blank-line codeword. Each section in the second plurality of sections is further partitioned into a plurality of blocks, each having L lines of P pixels and a pattern. For each partitioned block, one of a plurality V of code vectors, each having L lines of P pixels and a predetermined pattern which most closely matches the pattern of the partitioned block, is selected. Each partitioned block is represented by a respective non-blank codeword representing the selected one of the plurality of code vectors. The compressed image, thus, is represented by successive codewords representing either blank lines or code vectors. The method for expanding the compressed image represented by the successive codewords comprises the following steps. Blank lines are inserted into rasterized reproduced image representative data in response to blank-line codewords. The pattern of the code vector represented by each non-blank codeword is inserted into the rasterized reproduced image representative data in response to each non-blank codeword. A rasterized reproduced image results from this expansion.

23 Claims, 5 Drawing Sheets

LOSSY COMPRESSION AND EXPANSION ALGORITHM FOR IMAGE REPRESENTATIVE DATA

This application is a Continuation of application Ser. No. 08/265,994, filed Jun. 27, 1994, now abandoned.

The present invention relates to a lossy algorithm for use in compressing and expanding image representative data.

It is often necessary to transmit image information from one location to another or to store image information. For example, in a facsimile transmission system, image information is transmitted over telephone lines from a transmitter to a receiver. Because images require a large amount of data to represent them, it has been found necessary to compress the image representative data at the transmitter, in order to shorten transmission time, and then expand the received data at the receiver in order to reproduce the image. As another example, data processing systems now provide image processing capabilities, e.g. to minimize use of paper in offices. In such data processing systems it is necessary to store image representative information in a storage device of the data processing system. In order to minimize the amount of storage necessary to store such images, it has been found advantageous to compress the image representative data and store the compressed data in the storage device. When the image is needed, the compressed data is retrieved from the storage device, expanded, and further processed by the data processing system, for example, displayed on a display device.

There are several existing algorithms for compressing and expanding bilevel images, for example, PackBits, CCITT G3 and G4, JBIG, etc. These algorithms all compress images while retaining all information about the image. That is, an image may be compressed, and then expanded according to any of these algorithms, and the reconstructed image will be an exact copy of the starting image. Because no image information is lost, such algorithms are called lossless compression algorithms.

In some cases, however, it is possible to lose some image information without affecting the communications process. For example, in facsimile transmissions, and office-based image processors, users are usually more concerned with the information represented by the image, e.g. a typed message, than in the fidelity of the reproduced image to the original image. That is, so long as the person receiving the facsimile message or looking at the retrieved image of a typed paper can read the message, it is considered successful, even if the reproduced images of the letters do not look exactly like the letters in the original image. Thus, in such systems, it is possible to use lossy compression algorithms with no performance degradation being perceived by the users.

Furthermore, it is known that a lossy image compression/expansion algorithm will generally compress an image into less data than a lossless algorithm. Given such a decrease in the quantity of image representative data, an image may be transmitted in less time, which will lower the telephone costs for such a transmission. Thus, a user will perceive a performance improvement, e.g. faster transmission times and cheaper telephone bills, in an image transmission system using a lossy algorithm over a system using a lossless algorithm. Thus, a lossy image compression/expansion algorithm is desirable for systems where some image degradation is acceptable.

In accordance with principles of the present invention a method for compressing rasterized source image representative data comprises the following steps. The source image representative data is partitioned into a first plurality of sections each containing only blank lines, and a second plurality of sections each containing non-blank image representative data. Each section in the first plurality of sections is represented by a respective blank-line codeword. Each section in the second plurality of sections is further partitioned into a plurality of blocks, each having L lines of P pixels and a pattern. For each partitioned block, one of a plurality V of code vectors, each having L lines of P pixels and a predetermined pattern which most closely matches the pattern of the partitioned block, is selected. Each partitioned block is represented by a respective non-blank codeword representing the selected one of the plurality of code vectors. The compressed image, thus, is represented by successive codewords representing either blank lines or code vectors.

A method for expanding the compressed image represented by the successive codewords comprises the following steps. Blank lines are inserted into rasterized reproduced image representative data in response to blank-line codewords. The pattern of the code vector represented by each non-blank codeword is inserted into the rasterized reproduced image representative data in response to each non-blank codeword. A rasterized reproduced image results from this expansion.

Figure 1:
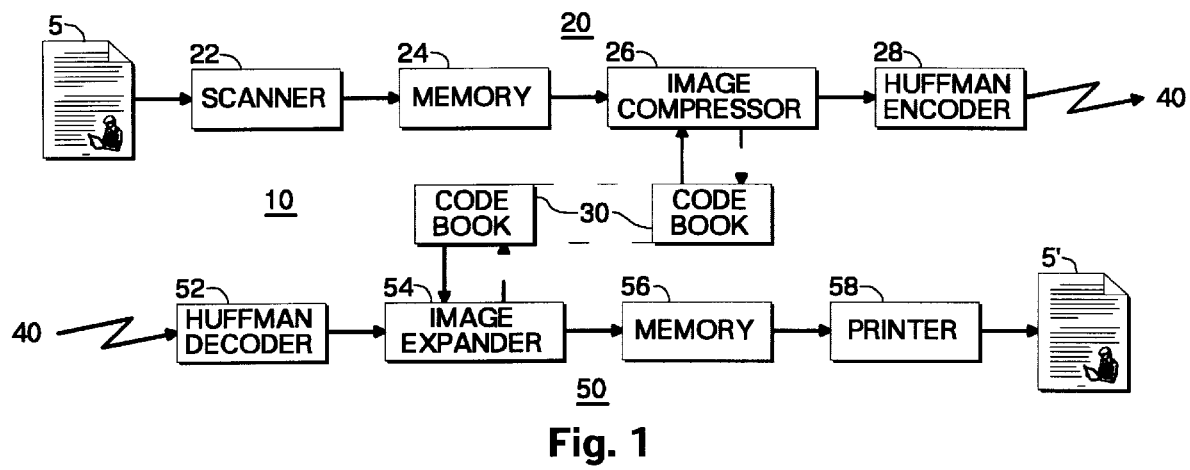
FIG. 1 is a block diagram of a facsimile transmission system using image compression/expansion according to the present invention.

FIG. 1 is a block diagram of a facsimile transmission system 10 using image compression/expansion according to the present invention. In FIG. 1, an image 5, illustrated as being a hard copy, e.g. a paper, image, is to be transmitted from a transmitter 20 to a receiver 50 over a transmission medium 40, e.g. telephone lines, to produce a corresponding image 5'. In FIG. 1, the paper containing the initial image 5 is supplied to the transmitter 20, which includes the serial connection of a scanner 22, a memory 24, an image compressor 26 and a Huffman encoder 28. The resulting image representative signal is supplied to the transmission medium 40.

The previously transmitted image representative signal is received from the transmission medium 40 by the receiver 50, which includes the serial connection of a Huffman decoder 52, an image expander 54, a memory 56 and a printer 58. The printer 58 produces a hard copy, e.g. a paper, containing an image 5' corresponding to the originally transmitted image 5. The image compressor 26 in the transmitter 20, and the image expander 54 in the receiver 50 each use a code book 30 to compress and expand, respectively, the image representative data. The code book 30 in the transmitter 20 is identical to the code book 30 in the receiver 50, illustrated in FIG. 1 by dashed lines joining the two code books.

In operation, the scanner 22 processes the hard copy of the image 5 and produces a signal representing the image in the form of a raster of pixels, in a known manner. In the illustrated embodiment, the pixels are bi-level, i.e. representing either a black or white pixel. It is possible for each pixel to represent a grey scale or color pixel. The raster of pixels is stored in the memory 24, also in a known manner. The stored raster of pixels is processed by the image compressor 26, in conjunction with the code book 30, to produce a signal representing the image in compressed form. The compressed image representative signal is in the form of a sequence of codewords representing the data. The manner in which the previously stored image representative data from the memory 24 is compressed will be described in more detail below. The sequence of codewords is encoded by the Huffman encoder 28, in a known manner. Although a Huffman encoder 28 is illustrated, any encoder which generates minimum size, variable length codewords, based on the probability of occurrence of that codeword in the message may also be used (called a probability encoder in this application). For example, a known arithmetic encoder may also be used. The sequence of Huffman codes is supplied to the transmission medium 40 in a known manner. For example, if the transmission medium 40 is a telephone connection, the Huffman codes are translated into audio tones by a modem.

A corresponding connection to the transmission medium 40, e.g. another modem, is provided in the receiver 50. The received Huffman codes are decoded by the Huffman decoder 52, to produce the sequence of codewords previously generated by image compressor 26. (As above, any probability decoder corresponding to the encoder 28 may be used.) These codewords are processed by the image expander 54, in conjunction with the code book 30, to produce a raster of pixels in the memory 56. The manner in which the sequence of received codewords is expanded into a raster of pixels in the memory 56 will be described in more detail below. The printer 58 processes the raster of pixels, and prints the image 5' represented by the raster of pixels.

The compression/expansion performed by the image compressor 26 and image expander 54, respectively, is lossy. I.e., the reproduced image 5' is not identical to the originally scanned image 5. However, the amount of data needed to transmit the image is reduced over that needed to transmit an exact copy of the originally scanned image, resulting in faster transmission times, and reduced telephone costs.

Although FIG. 1 is illustrated as a facsimile system, it could be used to store an image, if the transmission medium is considered to be a mass storage device, such as a known disk or tape drive. In such a system, a disk or tape controller would receive the Huffman codes from the Huffman encoder 28, and store them at a specified location on the disk or tape, in a known manner. When an image is desired, the previously stored Huffman codes representing that image are retrieved from the specified location on the disk or tape, also in a known manner, and supplied to the receiver 50.

Figure 2:
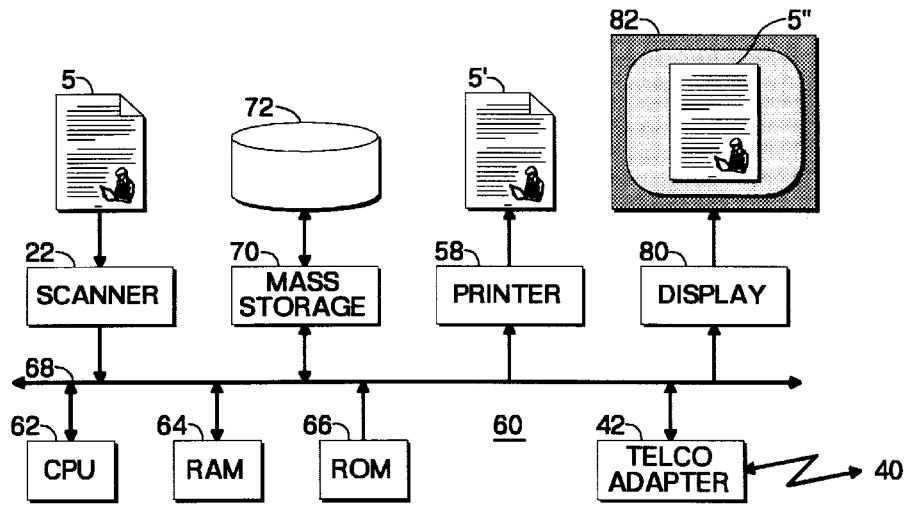
FIG. 2 is a block diagram of a data processing system using image compression/expansion according to the present invention.

The image compression system of FIG. 1 is illustrated as being embodied in a facsimile transmission system 10, it may also be embodied in a data processing system. FIG. 2 is a block diagram of a data processing system using image compression/expansion according to the present invention. In FIG. 2, elements corresponding to similar elements in FIG. 1 are designated by the same reference numbers and are not described in detail.

In FIG. 2, a data processing system 60 includes a central processing unit (CPU) 62, a read/write memory (RAM) 64 and a read only memory (ROM) 66 coupled together in a known manner through a system bus 68. The data processing system 60 also includes the scanner 22, illustrated as receiving the hard copy of the image 5, and a printer 58, illustrated as generating a hard copy of the corresponding image 5', both coupled to the system bus 68 in a known manner. The data processing system 60 further includes a mass storage adapter 70, coupling a disk drive 72 to the system bus 68; a display adapter 80, coupling a display device 82 to the system bus 68; and a telephone company (TELCO) adapter 42, coupling the telephone system as the transmission medium 40, to the system bus 68, all in known manner.

In operation, the CPU 62 reads instructions from the ROM 66 and/or the RAM 64, and executes those instructions to read data from the ROM 66 and/or the RAM 64, write data to the RAM 64, and transmit data to or receive data from the input/output adapters (i.e. scanner 22, mass storage adapter 70, printer 58, display adapter 80 and telco adapter 42) as appropriate, all over the system bus 68, in a known manner. In FIG. 2, the scanner 22 processes the hard copy 5 containing the image and stores the raster of pixels representing the image in the RAM 64 under control of the CPU 62. The CPU 62 reads the raster of pixels from the RAM 64, and processes them to produce a sequence of codewords in conjunction with the code book 30 (of FIG. 1). The code book 30 may be permanently stored in the ROM 66, or may be stored on the disk drive 72, and retrieved into the RAM 64 under control of the CPU 62. The CPU 62 may store the codewords temporarily in the RAM 64, or on the disk 72, or may process them as they are produced into a sequence of Huffman codes representing the compressed image. The sequence of Huffman codes may be stored in a file on the disk 72, and/or may be supplied to the telephone company adapter 42 for transmission to a remote location via the transmission medium 40.

A sequence of Huffman codes representing a compressed image may be received via the telephone company adapter 42 from a remote location, or a previously stored file of Huffman codes may be retrieved from the disk drive 72. Huffman codes received from the telephone company adapter 42 may be stored on the disk drive 72. The received or retrieved Huffman codes may also be stored in the RAM 64. The CPU 62 performs Huffman decoding of the Huffman codes to produce a sequence of codewords. These codewords may be stored in the RAM 64, may be temporarily stored on the disk drive 72, or may be processed as they are produced. The CPU 62 then processes the codewords to produce a raster of pixels in the RAM 64 representing the received or retrieved image. Again, the code book 30 may be permanently stored in the ROM 66, or may be stored in a file on the disk drive 72. The raster of pixels in the RAM 64 may be printed by the printer 58, in a known manner to generate a hard copy image 5' corresponding to the original image 5, or may be displayed on the display device 82 as a displayed image 5".

In terms of data compression/expansion, FIG. 2 operates similarly to the system illustrated in FIG. 1, but provides more flexibility with respect to transmission, storage and reception of image representative data. For example, the data processing system of FIG. 2 may be used as a facsimile system 10 as illustrated in FIG. 1, without the mass storage adapter 70 and disk drive 72 and the display adapter 80 and display device 82. Alternatively, a facsimile system 10 may be constructed with mass storage and display capability for added functionality over standard facsimile systems. With this capability, scanned and received images may be compressed and stored on the disk drive 72 for retrieval later. Also, scanned, stored and received compressed images may be expanded and displayed on the display device 82, possibly obviating the need for a hard copy from the printer 58.

Alternatively, the data processing system of FIG. 2 may incorporated in a standard data processing system, such as a personal computer, to provide the capabilities of: scanning hard copy images; storing the images in compressed form; displaying and/or printing the images represented by the previously stored compressed images; and transmitting and/ or receiving the images in compressed form.

Figure 3:
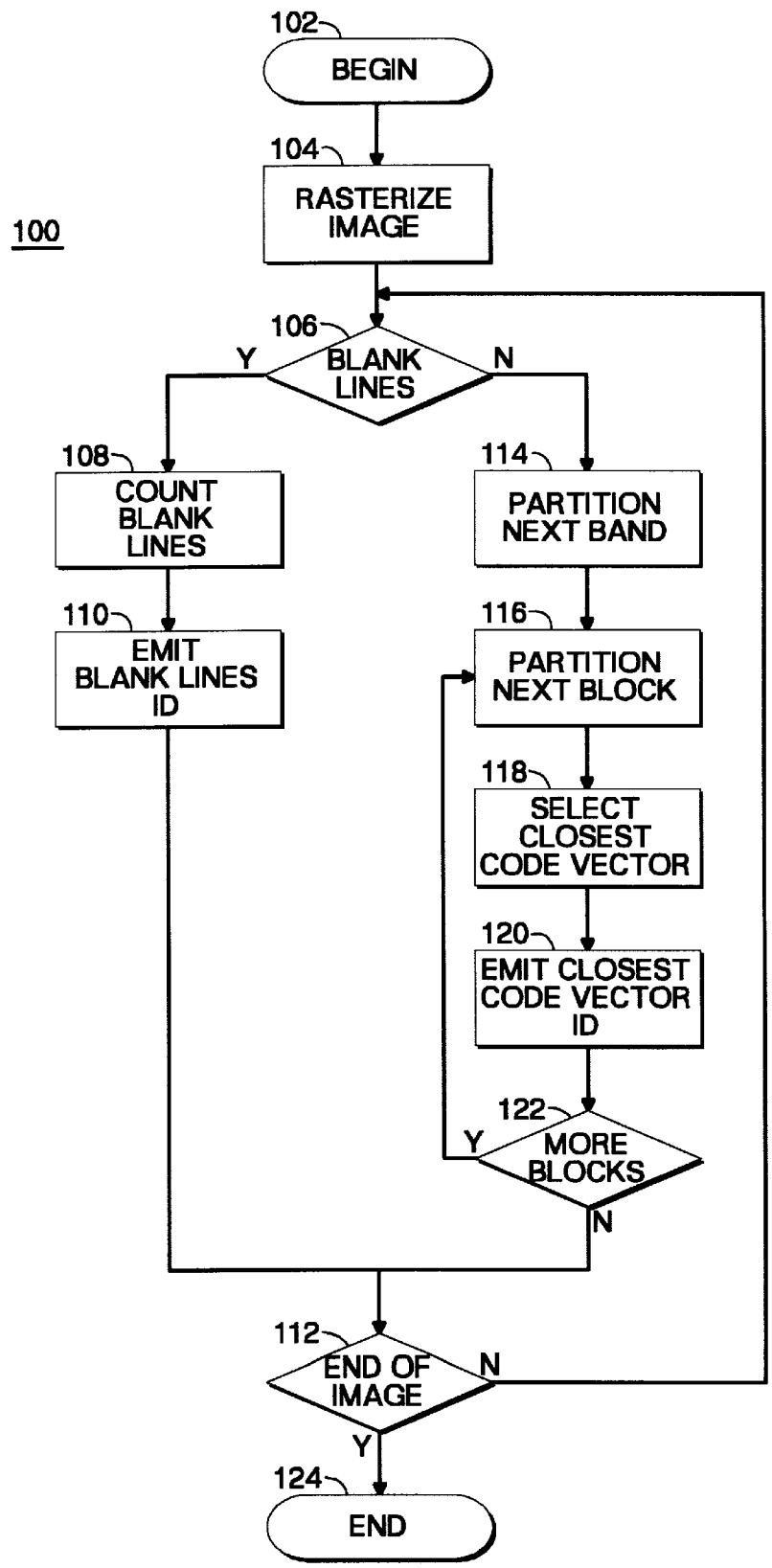
FIG. 3 is a flow diagram illustrating the method of compressing image representative data according to the present invention.
Figure 4:
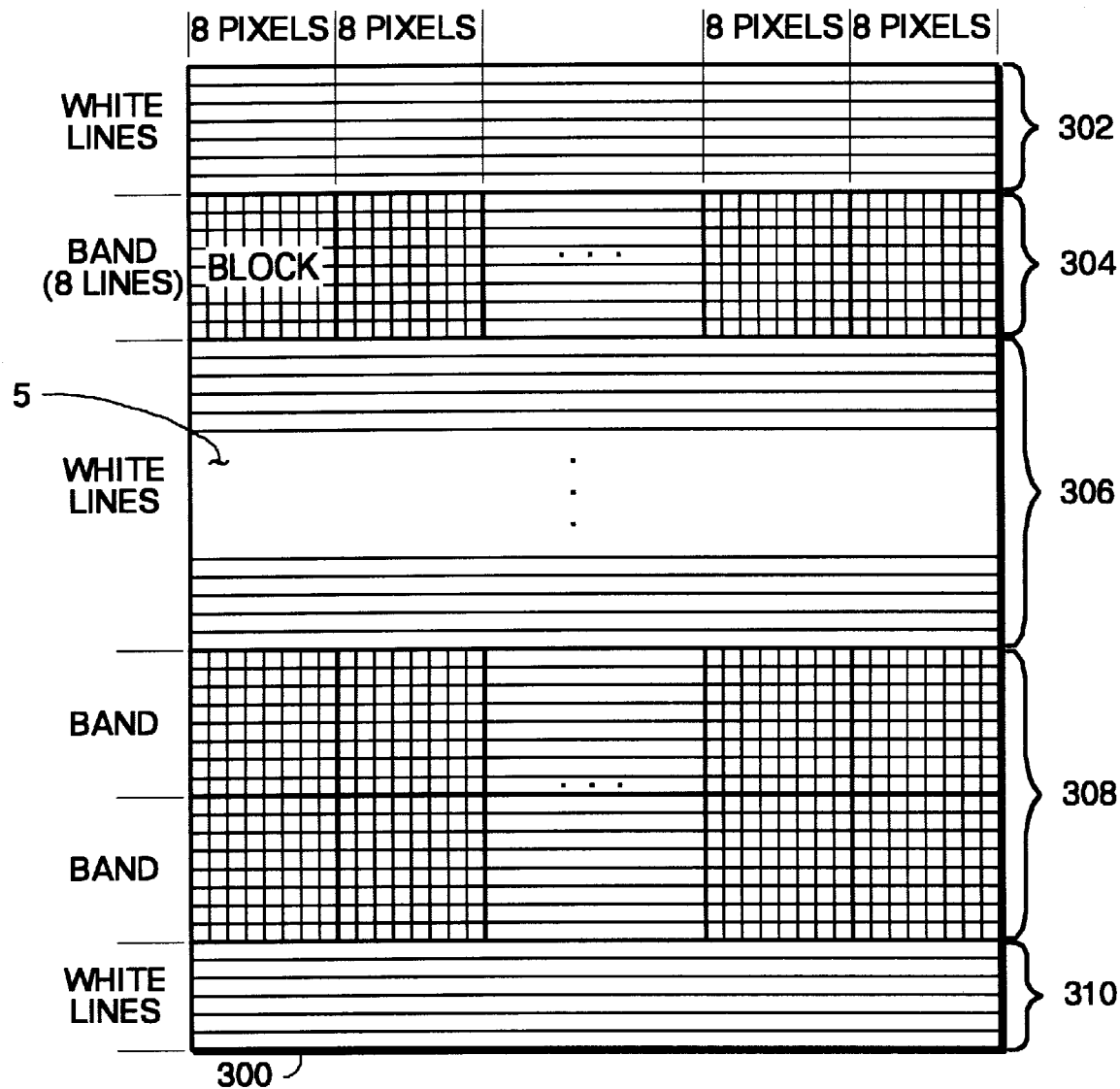
FIG. 4 is a diagram of an image illustrating the process of partitioning an image into blocks.
Figure 5:
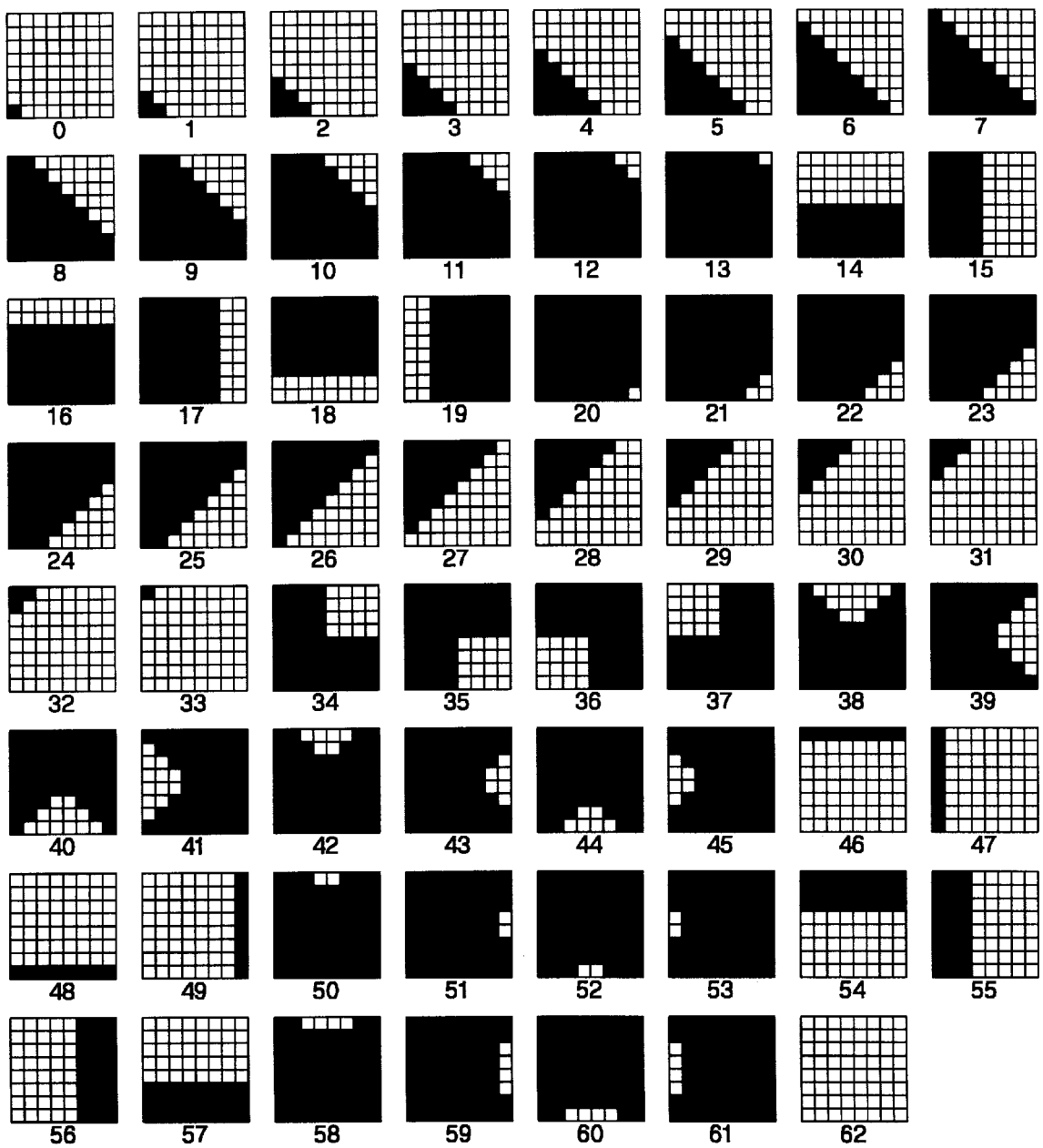
FIG. 5 is a diagram illustrating an exemplary code book for use in compressing an image according to the present invention.

FIG. 3 is a flow diagram illustrating a method 100 of compressing image representative data according to the present invention. FIG. 4 is a diagram of an image illustrating the process of partitioning an image into blocks, and FIG. 5 is a diagram illustrating an exemplary code book 30 for use in compressing an image according to the present invention. FIG. 4 and FIG. 5 are useful in understanding the operation of the method 100 of compressing an image illustrated in FIG. 3. The method 100 illustrated in FIG. 3 is performed by the image compressor 26 (of FIG. 1), or by the CPU 62 (of FIG. 2).

In FIG. 3, step 102 is where the image compression method 100 begins. In step 104, the image is stored, in a known manner, in the memory 24 or RAM 64, as a raster of bilevel pixels. FIG. 4 illustrates such a raster of pixels. In FIG. 4, the large rectangle 300 represents the raster of bilevel pixels, consisting of a plurality of lines. Each line in FIG. 4 is represented by a horizontal stripe. Each line, in turn, contains a plurality of vertically aligned pixels, each representing one of two possible states, black or white, of that pixel in the image 5. Each pixel in FIG. 4 is represented by a square. In order to simplify FIG. 4, not every pixel in every line is illustrated. Instead, only a portion of the pixels are illustrated. In sections 304 and 308, individual pixels are represented by respective squares. In sections 302, 306 and 310, only lines are represented, but it should be understood that all the lines in all the sections include the same number of pixels as those lines illustrated in sections 304 and 308.

Once the image has been rasterized, it is processed line-by-line from top to bottom, and each line is processed pixel-by-pixel from left to right. Specifically, processing begins with the topmost line illustrated in FIG. 4. In step 106 of FIG. 3, blank lines, that is lines with only white pixels, are detected. If a blank line is detected in step 106, then the number of consecutive blank lines are counted in step 108. In FIG. 4, the topmost seven lines, section 302, are blank lines. Thus, the result of step 108 is 7. Once the number of consecutive blank lines has been determined, a blank-lines codeword is emitted in step 110 representing the number of blank lines.

There are several alternative coding methods which may be used to indicate blank lines. In one method, a first bit of a blank-lines codeword is "0" (or alternatively "1"), followed by a fixed number of bits containing the number of blank lines, encoded as a binary number. For example, for an eight bit codeword, the fixed number of bits is seven bits; thus, up to 128 consecutive blank lines may be represented by a single codeword. For example, the first codeword emitted for the image represented in FIG. 4 using this coding method is $00000111_2$.

In another alternative coding method, one of a fixed number of predetermined six bit codewords (to be described in more detail below) may be reserved as a blank-lines codeword, again to be followed by a fixed number of bits containing the number of consecutive blank lines represented by that codeword. In the example to be described in more detail below, there are 64 predetermined codewords, which may be identified by a six-bit binary identifier. If the last codeword (i.e. codeword 63) is selected to represent blank lines, and is followed by, again, a seven bit word representing the number of blank lines, then the first codeword (or more accurately, codeword sequence) emitted for the image represented in FIG. 4 using this coding method is $111111_2$, $000011_{12}$. In either of these two methods, if there are more consecutive blank lines than can be represented by a single codeword, then a first codeword is emitted to represent the maximum number of blank lines, and a second codeword is emitted to represent the remaining blank lines. Any number of sequential blank-lines codewords may be emitted to represent any number of consecutive blank lines.

In step 112, a check is made to determine if the end of the image has been reached, i.e. if the bottom line been processed. If there are no more lines to process, the compression process is complete, and ends in step 124. If, however, there is more of the image remaining to be compressed, the step 106 is again entered. Continuing the example, the eighth line of the image 5 illustrated in FIG. 4 is not blank (otherwise it would have been included in the blank-lines codeword previously emitted in step 110). Thus, step 114 is entered. In step 114, the image is partitioned into a number L of lines. This number of lines is called a band in the remainder of this application. In the illustrated example, L=8. Thus, in the illustrated example, the next eight lines, section 304, forms the partitioned band.

In step 116, the band, section 304, previously partitioned in step 114 is partitioned into blocks, each consisting of P vertically aligned pixels in each of the L lines in the previously partitioned band. This rectangular array of L lines by P pixels in each line is called a block in the remainder of this application. In the illustrated example, P=8. Thus, a square array of 8 lines by 8 pixels is partitioned by blocks 114 and 116. Because the image is processed from left to right, the first block partitioned is the leftmost square in section 304 of FIG. 4, illustrated by surrounding thick lines and labeled "BLOCK" in the center.

In step 118, the closest code vector to the block BLOCK partitioned in blocks 114 and 116 is selected from the code book 30 (of FIG. 1). In general, a code book 30 contains a predetermined number V of code vectors. The number V is preferably a power of two, i.e. $V=2^i$, where i is an integer, although one or more of the code vectors may be reserved for other uses, as alluded to above and described in more detail below. Each code vector is a rectangular array having L lines, each line including P vertically aligned pixels, i.e. each code vector has the same dimensions as a partitioned block in image 5. Each pixel in the code vector can be either black or white.

FIG. 5 illustrates a sample code book for use with the present example. In the illustrated example, L=8 and P=8 (e.g. the size of the partitioned blocks) and V=64 (i.e. $2^6$). That is, there are 64 eight-by-eight code vectors in the code book 30. As described above, one codeword, and its associated code vector, is reserved to indicate blank lines, thus only 63 code vectors are available for compressing the image representative data. In FIG. 5, 63 blocks of 8 lines by 8 pixels are illustrated. Each is identified by an index from 0 to 62 illustrated beneath the code vector itself. In step 118, the currently partitioned block of the image 5 is respectively compared to all of the code vectors illustrated in FIG. 5, and the closest code vector from among all the code vectors is selected, a process known as binary vector quantization. The intent is to identify the code vector whose pattern most closely approximates the pattern of the partitioned block.

An exemplary method for performing this comparison is to compare corresponding pixels of the partitioned block and the code vector, and keep a count of the number of pixels which match. The count is first set to zero. Then, the leftmost pixel in the top line of the first code vector is compared to the leftmost pixel in the top line of the partitioned block. If they are the same (i.e. they are both black or both white) one is added to the count. If they are different (i.e. one is black and the other is white) the count remains unchanged. Then the second pixel in the top line of the code vector and partitioned block are similarly compared, and so forth for each pixel in each line. The resulting count after comparing all the pixels is a measure of the closeness of the code vector pattern to the pattern of the partitioned block. This count can run from 0, meaning that none of the pixels match (i.e. the code vector is a photographic negative of the partitioned block) to 64, meaning that the code vector is an exact copy of the partitioned block. A separate count is generated for each of the 63 code vectors illustrated in FIG. 5. The code vector with the highest count is selected as the closest code vector. If more than one shares the highest count, any of them may be selected as the closest. Other methods for determining the closeness of the respective code vectors to the partitioned block are possible, and may be used in the present invention.

In step 120, the identification (ID) number of the code vector selected as closest to the partitioned block in step 118 is emitted as the codeword representing that block. As described above, there are two possible methods for emitting codewords. In the first method, codewords representing blank lines (emitted by step 110) have a first bit which is a "0" (or "1")as described above. Conversely, codewords representing code vectors have a first bit which is a "1" (or "0"), and are followed by the ID number of the selected code vector, expressed as a binary number. In the present example, the ID numbers of the 64 code vectors may be represented by six-bit binary numbers. Thus, codewords representing partitioned blocks have seven bits: a leading "1" (or "0")followed by six bits of ID. For example, if the closest code vector is determined to be the code vector having the ID 27, then the emitted codeword for that partitioned block is $1011011_2$.

In the second method, one of the code vector IDs (e.g. 63) is reserved to represent blank lines. Only the remaining 63 code vectors have patterns which are compared to partitioned blocks. In this example, codewords representing partitioned blocks have six bits. For example, if the closest code vector is determined to have ID 27 (as above), then the emitted codeword for that partitioned block is $011011_2$.

In step 122, of FIG. 3, a check is made to determine whether the last (rightmost) block of the previously partitioned band has been processed. If not, then step 116 is reentered to partition and process the next block. Continuing the present example, after the leftmost block BLOCK has been processed, the next block to the right (also outlined in thicker lines in FIG. 4) is partitioned and processed by selecting the closest code vector, and emitting the ID of the closest code vector, as described in detail above. For example, the closest code vector to this partitioned block may have ID 10. The emitted codeword for this partitioned block is, therefore, either $0001010_2$, for seven bit codewords; or $001010_2$, for six bit codewords. A sequence of codewords are emitted, in similar manner, representing all the partitioned blocks in the partitioned band, processed from left to right. After the rightmost block in the partitioned band has been processed, there are no more blocks in the band to be processed and step 112 is entered again to determine whether the last line in the image 5 has been processed, and the processed.

It is also possible to essentially double the number of code vectors without increasing the memory necessary to store the codebook 30. In such a system, the binary number expressing the number of the selected code vector includes an extra bit. The partitioned block is compared not only to each of the given code vectors, but also to the inverse, or photographic negatives, of each of those code vectors. If the partitioned block is closest to the inverse of a code vector, then the extra bit is set to a "1", otherwise it is set to a "0". To use such a technique in the present example, seven bits are necessary to identify a code vector: six to identify the selected code vector, and one to specify whether the photographic negative or positive of the code vector is closest to the previously partitioned block. Once the binary number identifying the selected code vector is generated, the codeword may be generated by either of the above methods (i.e. a leading "1" (or "0")followed by the seven bit code vector binary number; or the seven bit code vector binary number alone, with one codeword reserved to express blank lines).

The result of the compression method illustrated in FIG. 3 is a sequence of codewords each either representing a number of consecutive blank lines, or closest code vectors to successive blocks in a band of the image, as scanned from top to bottom and left to right. For the image 5 illustrated in FIG. 4, the output of the image compressor 26 (of FIG. 1) is a first codeword representing the seven blank lines, section 302, at the top of the image 5; then a series of codewords representing the IDs of the closest code vectors to successive blocks in the band, section 304, scanned left to right; then a codeword (or possibly several codewords) representing the blank lines in section 306; then a series of codewords representing successive blocks in the top band of section 308, scanned left to right, followed by codewords representing successive blocks in the bottom band in section 308, scanned left to right; and finally a codeword representing the six blank lines, section 310, at the bottom of the image 5.

Figure 6:
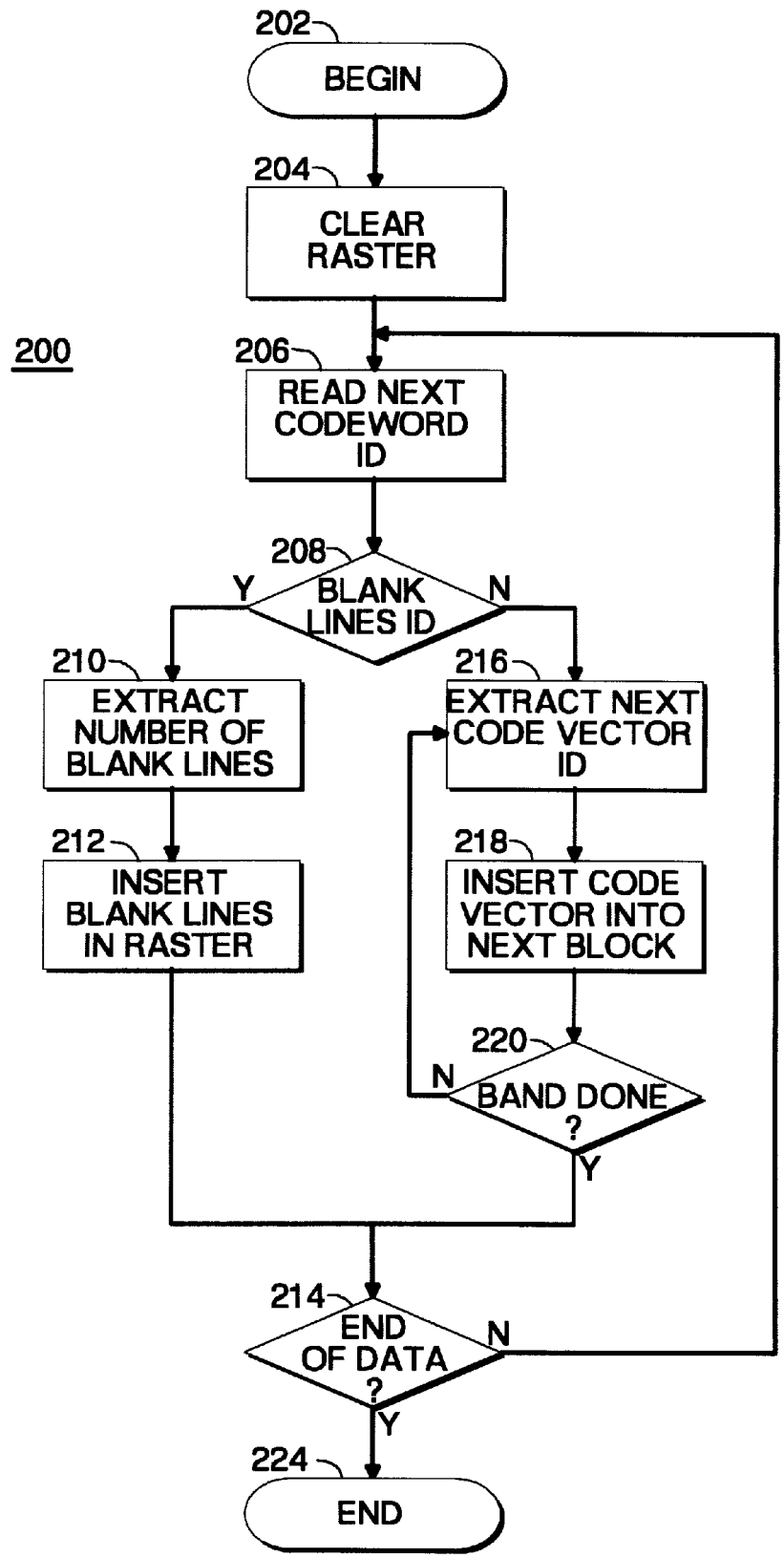
FIG. 6 is a flow diagram illustrating the method of expanding previously compressed image representative data according to the present invention.

FIG. 6 is a flow diagram illustrating a method 200 for expanding previously compressed image representative data according to the present invention. FIG. 6 may be better understood by reference to FIG. 4 and FIG. 5. In FIG. 6, the expansion method is begun in step 202. In step 204, a portion of the memory 56 (of FIG. 1) or of the RAM 64 (of FIG. 2) is allocated as a buffer to hold a rasterized expanded image, and is cleared. This raster buffer is filled in from top to bottom, and from left to right, based on the received codewords representing the image 5. Thus, the first portion of the raster buffer to be filled in represents the upper left-hand corner of the reproduced image 5'. When the image expansion is complete, the contents of the raster buffer represents the reproduced image 5'.

In step 206 of FIG. 6, the first codeword is read. In step 208, this codeword is checked to determine if it represents sequential blank lines, or represents a partitioned block. This may be done by checking either the first bit (if seven bit codewords are used, as described above) or by checking if the codeword contains the ID of the code vector reserved for representing blank lines (if six-bit codewords are used, also as described above).

If this codeword represents blank lines, then step 210 is entered. In step 210, the number of blank lines represented by this codeword is extracted. This may be done by either masking the last six bits of the current codeword (if seven bit codewords are used) or by reading the next codeword (if six bit codewords are used). In either case, the extracted six bits represents the number of blank lines represented by this codeword. In step 212, the portion of the previously allocated raster, beginning with the next line to be filled in the raster buffer, is filled with data representing the number of blank lines represented by this codeword. If the raster is cleared to data representing white pixels in the step 204, then the step 212 merely skips down in the raster buffer to the next line to be filled in below the blank lines.

A check is made in step 214 to determine if there are more codewords to be processed. If no more codewords remain to be read, then the expansion method ends, in step 224. Otherwise, step 206 is reentered and the next codeword is read. If, in step 208, it is determined that this codeword represents a partitioned block, then step 216 is entered. In step 216, a band, made up of the next eight lines in the raster buffer, is partitioned. Then the leftmost eight vertically aligned pixels in the band are partitioned to be filled in first. The ID of the code vector in the code book 30 (of FIG. 5) is extracted from the codeword. This may be done by masking the last six bits of the codeword, if seven-bit codewords are used, or by taking the six-bit codeword as is, if six-bit codewords are used. This ID is used as an index into the code book 30 to retrieve the eight line by eight pixel pattern of the code vector represented by that ID. The eight line by eight pixel pattern of that code vector is copied from the code book 30 into the newly partitioned eight line by eight pixel block in the raster buffer. A check is made in step 220 to determine whether all the blocks in the current band have been filled in. If not, then step 216 is reentered. The next eight vertically aligned bits in the band are partitioned to be filled in next. The next codeword representing the next partitioned block is read, and the code vector pattern, represented by the ID in this codeword is copied into the newly partitioned block in the raster buffer. Blocks are filled in from left to right, until the band has been completely filled in. When in step 220 it is determined that the band has been filled in, step 214 is reentered to determine if any codewords remain to be processed, as described above.

Continuing the above example, and referring to FIG. 4, the raster buffer representing the expanded image 5' is filled with seven blank lines at the top, in response to the first codeword representing the image. The leftmost block of the first band, (section 304) contains the pattern from the code vector (of FIG. 5) with the ID 27, in response to the second codeword. The next block to the right is filled with the pattern from the code vector with the ID 10, in response to the third codeword, and so forth. The blank lines of sections 306 and 310 are accurately represented, and the blocks in section 304 and 308 contain respective code vector patterns.

The result of the expansion of the previously compressed image is an image made up of either blank lines, or of eight by eight blocks selected from only the 64 (or 63, depending upon the coding method selected) code vectors in the code book 30. This image is not an exact copy of the original image, and some information representing the original image has been lost. I.e. this coding method is a lossy coding method. However, when the image is printed (by printer 58) or displayed (on display device 82), the blocks in the original image 5 are represented by the code vector patterns from the code book 30 which most closely resemble the patterns in the blocks of the original image 5. A person reading the reproduced image 5' or 5" will be able to discern the message in the original image 5, even though the reproduced image 5' differs from the original image 5. For example, if the image 5 is of a typed message, even though each typed letter in the reproduced image 5' may not look exactly like the corresponding letter in the original image, a reader will be able to determine what that letter is, and will, therefore, be able to read the typed message from the reproduced image 5'.

Referring again to FIG. 5, each code vector in the code book 30 has a respective predetermined pattern of white and black pixels. These patterns may be predetermined, constant and based on an analysis of the type of images to be compressed and expanded. For example, in a facsimile system, a large sample of representative facsimile images may be analyzed a priori, using a well known generalized Lloyd algorithm to determine which set of code vectors allows the most recognizable reproduced image. The code book 30 is then generated with these patterns, and permanently included in each facsimile system 10. Alternatively, an original image 5, which is to be compressed, may be analyzed, again using a known generalized Lloyd algorithm, on-the-fly, to generate a set of code vectors which results in the least distortion in the reproduced image 5'.

Referring to FIG. 1, this on-the-fly analysis is performed by the image compressor 26, which generates the new code vectors, and stores them in the code book 30, illustrated in phantom by a line from the image compressor 26 to the code book 30. Then the analyzed image 5 may be compressed. These newly generated code vectors are then transmitted as part of the facsimile transmission, or stored as part of the compressed image file on mass storage. In the above example, 64 eight-by-eight code vectors requires 512 bytes of storage. When these code vectors are received or retrieved, the image expander 54 stores them in the code book 30, illustrated in phantom by a line from the image expander 54 to the code book 30. The received or retrieved compressed image data is then expanded using these code vectors.

This image analysis, either a priori or on-the-fly, may also change other parameters of the compression/expansion method described above. For example, the number of lines L and number of pixels P in each code vector and corresponding block in the image raster, and the aspect ratio represented by L and P, may be changed. Further, the number of code vectors V in the code book 30 may also be changed. For a given code vector and block size (L-by-P), if the number of code vectors V is increased, the number of bits necessary to represent the image increases, but the fidelity of the reproduced image to the original image increases. If the code vector and block size (L-by-P) is decreased, then there are more blocks in the image, and more codewords are required to represent those blocks. However, fewer code vectors are necessary to represent the subset of possible patterns is each block, and thus, the number of bits in each codeword is decreased, offsetting the increase in the number of codewords. If the number of lines L in each code vector and block in the image raster is selected properly, the use of blank line codes may be maximized, thus, minimizing the number of bits necessary to represent the image. The number of pixels P may then be adjusted to maintain a desired aspect ratio. These are but examples of optimizations which may be performed by properly selecting the parameters L, P and V. One skilled in the art will realize that other optimizations may be performed. It has been found that the exemplary parameters given above, i.e. L=8, P=8 and V=64 provides satisfactory performance with respect to usability of the reproduced image 5'.

As described above, when an image has been compressed using the method described above, some image information is lost, thus, the reproduced image is not an exact copy of the original image. However, after the image has once been compressed, it may be repeatedly expanded and compressed using the above process without losing any further information. I.e. subsequent compressions and expansions do not result in any further degradation in fidelity of the expanded image from the original image.

What is claimed is:

1. A method for compressing rasterized source image representative data having lines of pixels, into compressed image representative data including successive image representative codewords, comprising the steps of:

partitioning the source image representative data into a first plurality of sections each containing only blank lines, and a second plurality of sections each containing non-blank image representative data;

representing each section in the first plurality of sections by a respective blank-line codeword;

further partitioning each section in the second plurality of sections into a plurality of blocks, each having L lines of P pixels and a pattern; and for each partitioned block:
selecting one of a plurality V of code vectors having L lines of P pixels and a predetermined pattern which most closely matches the pattern of the partitioned block; and
representing each partitioned block by a respective non-blank codeword representing the selected one of the plurality of code vectors.

2. The method of claim 1, further including the step of generating the plurality of code vectors a priori by analysis of representative images.

3. The method of claim 2 wherein the analysis of representative images uses a generalized Lloyd algorithm.

4. The method of claim 1, wherein the plurality of code vectors are generated by analyzing the source image representative data, and the compressed image representative data further includes the plurality of code vectors.

5. The method of claim 4 wherein the analysis of the source image representative data uses a generalized Lloyd algorithm.

6. The method of claim 1, further comprising the step of probability encoding the successive codewords.

7. The method of claim 1 wherein L=8, P=8 and V=64.

8. A method for compressing rasterized source image representative data having lines of vertically aligned pixels, into compressed image representative data including successive image representative codewords, comprising the steps of:

designating the top line of the rasterized source image representative data as a current line;

partitioning the source image representative data into a first plurality of sections each containing only blank lines, and a second plurality of sections each containing non-blank image representative data including the step of determining if the current line is a blank line;

representing each section in the first plurality of sections by a respective blank-line codeword;

further partitioning each section in the second plurality of sections into a plurality of blocks, each having L lines of P pixels and a pattern by performing the steps of, if the current line is not a blank line:

partitioning a current band of lines in the rasterized source image representative data consisting of L adjacent lines, with the top line being the current line and designating the leftmost pixel as the current pixel;

forming a block consisting of P adjacent vertically aligned pixels in each line in the current band, with the leftmost pixel being the current pixel;

designating the pixel P pixels to the right of the current pixel as the current pixel;

repeating the forming and designating steps until each pixel in the current band has been formed into a block; and designating the line L lines below the current line as the current line; and for each partitioned block:
selecting one of a plurality V of code vectors having L lines of P pixels and a predetermined pattern which most closely matches the pattern of the partitioned block; and
representing each partitioned block by a respective non-blank codeword representing the selected one of the plurality of code vectors.

9. The method of claim 8, wherein the step of representing each section in the first plurality of sections by a respective blank-line codeword comprises the steps of, if the current line is a blank line:

counting a number of consecutive blank lines beginning with the current line;

emitting the blank-line codeword including data representing the number of consecutive blank lines; and designating the first non-blank line as the current line.

10. A method for compressing rasterized source image representative data having lines of pixels, into compressed image representative data including successive image representative codewords, comprising the steps of:

designating the top line of the rasterized source image representative data as a current line;

partitioning the source image representative data into a first plurality of sections each containing only blank lines, and a second plurality of sections each containing non-blank image representative data by performing the step of determining if the current line is a blank line;

representing each section in the first plurality of sections by a respective blank-line codeword by performing the steps of, if the current line is a blank line:

counting a number of consecutive blank lines beginning with the current line;

emitting the blank-line codeword including data representing the number of consecutive blank lines; and designating the first non-blank line as the current line; and further partitioning each section in the second plurality of sections into a plurality of blocks, each having L lines of P pixels and a pattern; and for each partitioned block:
selecting one of a plurality V of code vectors having L lines of P pixels and a predetermined pattern which most closely matches the pattern of the partitioned block; and
representing each partitioned block by a respective non-blank codeword representing the selected one of the plurality of code vectors.

11. A method for compressing rasterized source image representative data having lines of pixels, each pixel in the rasterized source image representative data having one of two levels, into compressed image representative data including successive image representative codewords, comprising the steps of:

partitioning the source image representative data into a first plurality of sections each containing only blank lines, and a second plurality of sections each containing non-blank image representative data;

representing each section in the first plurality of sections by a respective blank-line codeword;

further partitioning each section in the second plurality of sections into a plurality of blocks, each having L lines of P pixels and a pattern, and for each partitioned block:
  selecting one of a plurality V of code vectors having L lines of P pixels, each pixel in each code vector having one of two levels, and a predetermined pattern which most closely matches the pattern of the partitioned block by performing the steps of:
    comparing the respective levels of corresponding pixels in a partitioned block and one of the plurality of code vectors;
    counting the number of corresponding pixels having the same level;
    repeating the comparing and counting steps for each one of the plurality of code vectors; and
    selecting the code vector having the highest count; and
  representing each partitioned block by a respective non-blank codeword representing the selected one of the plurality of code vectors and emitting the non-blank codeword including data representing the selected code vector.

12. The method of claim 11 wherein:
the selecting step further comprises the step of counting the number of corresponding pixels having different levels, representing an inverse code vector; and
the step of representing each partitioned block by a respective non-blank codeword further comprises the step of emitting the codeword including data representing the selected code vector and data representing whether the selected code vector is an inverse code vector.

13. A method for expanding compressed image representative data including successive image representative codewords, each representing either blank lines or one of a plurality V of code vectors each having L lines and P pixels and a predetermined pattern, into rasterized reproduced image representative data having lines of pixels, comprising the steps of:
  inserting blank lines into the rasterized reproduced image representative data in response to a blank-line codeword; and
  inserting the pattern of the code vector into the rasterized reproduced image representative data in response to a code vector codeword.

14. The method of claim 13, wherein:
the successive image representative codewords are probability encoded; and
the method further comprising the step of probability decoding the probability encoded codewords.

15. The method of claim 13, further comprising the step of generating the plurality of code vectors a priori by analysis of representative images.

16. The method of claim 15 wherein the analysis of representative images uses a generalized Lloyd algorithm.

17. The method of claim 13, wherein the compressed image representative data further includes the plurality of code vectors.

18. The method of claim 13 wherein L=8, P=8 and V=64.

19. A method for expanding compressed image representative data including successive image representative codewords, each representing either blank lines or one of a plurality V of code vectors each having L lines and P pixels and a predetermined pattern, each blank-line codeword including data representing a number of blank lines represented by the blank-line codeword, into rasterized reproduced image representative data having lines of pixels, comprising the steps of:
  designating the top line of the rasterized reproduced image representative data as a current line;
  inserting blank lines into the rasterized reproduced image representative data in response to a blank-line codeword by performing the steps of:
    extracting the number of blank lines represented by the blank line codeword;
    inserting raster data into successive lines in the rasterized reproduced image representative data representing the extracted number of blank lines starting with the current line; and
    designating the line following the bottommost inserted line as the current line; and
  inserting the pattern of the code vector into the rasterized reproduced image representative data in response to a code vector codeword.

20. A method for expanding compressed image representative data including successive image representative codewords, each representing either blank lines or one of a plurality V of code vectors each having L lines and P pixels and a predetermined pattern, into rasterized reproduced image representative data having vertically aligned lines of pixels, comprising the steps of:
  designating the top line of the rasterized reproduced image representative data as a current line;
  inserting blank lines into the rasterized reproduced image representative data in response to a blank-line codeword; and
  inserting the pattern of the code vector into the rasterized reproduced image representative data in response to a code vector codeword by performing the steps of:
    partitioning the rasterized reproduced image representative data into a current band of lines consisting of L adjacent lines, with a top line being the current line, and designating a leftmost pixel as the current pixel;
    further partitioning the current band into a block consisting of P adjacent vertically aligned pixels in each line in the current band, with the leftmost pixel being the current pixel;
    copying the pattern of the code vector represented by the code vector codeword into the block; and
    designating the pixel P pixels to the right of the current pixel as the current pixel;
    repeating the block partitioning, copying and designating steps until a code vector pattern has been copied into each block in the current band; and
    designating the line L lines below the current line as the current line.

21. The method of claim 20 wherein:
the code vector codeword contains information indicating whether the selected code vector is an inverse code vector; and
the copying step comprises the step of copying the inverse pattern of the code vector represented by the code vector codeword into the block if the inverse code vector indicative information indicates that the code vector is an inverse code vector.

22. The method of claim 20, wherein:
each blank-line codeword includes data representing a number of blank lines represented by the blank-line codeword; and
the step of inserting blank lines comprises the steps of:
  extracting the number of blank lines represented by the blank line codeword;
  inserting raster data into successive lines in the rasterized reproduced image representative data representing the extracted number of blank lines starting with the current line; and designating the line following the bottommost inserted line as the current line.

23. A method for compressing rasterized source image representative data having lines of pixels, into compressed image representative data including successive image representative codewords, comprising the steps of:

designating the top line of the rasterized source image representative data as a current line;

if the current line is a blank line:
counting a number of consecutive blank lines;

emitting a blank-line codeword including data representing the number of consecutive blank lines; and if the current line is a non-blank line:

partitioning the source image representative data into a section containing non-blank image representative data;

vector quantizing the image representative data in the section and emitting respective non-blank codewords representing the image representative data in the section; and designating the next line as the current line.

\* \* \* \* \*